(12) United States Patent
Coates et al.

(10) Patent No.: US 6,436,175 B1
(45) Date of Patent: Aug. 20, 2002

(54) ADSORPTION APPARATUS

(75) Inventors: John Robert Coates, Farnham; John Alan Schefele, London; Paul William Kingston, Atherton, all of (GB)

(73) Assignee: The BOC Group plc, Windlesham (GB)

( * ) Notice: Subject to any disclaimer, the term of this patent is extended or adjusted under 35 U.S.C. 154(b) by 28 days.

(21) Appl. No.: 09/642,290

(22) Filed: Aug. 18, 2000

(30) Foreign Application Priority Data

Aug. 23, 1999 (GB) .............................................. 9919965

(51) Int. Cl.⁷ ............................................ B01D 53/047
(52) U.S. Cl. ............................. 96/126; 55/356; 96/130; 96/146; 96/152
(58) Field of Search .............................. 55/356; 96/108, 96/121, 122, 130–147, 152

(56) References Cited

U.S. PATENT DOCUMENTS

| | | | | |
|---|---|---|---|---|
| 1,577,200 A | * | 3/1926 | Voress et al. ................. | 96/152 |
| 2,678,108 A | * | 5/1954 | Reid ........................... | 96/133 |
| 3,731,460 A | * | 5/1973 | Narumi ..................... | 55/356 X |
| 3,925,041 A | * | 12/1975 | Patterson et al. ......... | 96/152 X |
| 4,750,999 A | * | 6/1988 | Roberts et al. ............ | 96/152 X |
| 4,784,675 A | * | 11/1988 | Leber et al. .............. | 96/139 X |
| 4,840,651 A | * | 6/1989 | Tiggelbeck ................ | 96/147 X |
| 4,932,988 A | * | 6/1990 | Lutterbach et al. ........... | 55/356 |
| 5,078,764 A | * | 1/1992 | Lutterbach et al. ........... | 55/356 |
| 5,512,087 A | * | 4/1996 | Varner et al. ............. | 55/356 X |
| 5,961,697 A | * | 10/1999 | McManus et al. ......... | 55/356 X |
| 5,980,615 A | * | 11/1999 | Roe .......................... | 96/144 X |

* cited by examiner

Primary Examiner—Robert H. Spitzer
(74) Attorney, Agent, or Firm—Philip H. Von Neida; Salvatore P. Pace (57) ABSTRACT

A modular adsorption plant comprises one or more transportable cargo containers which hold the various adsorbent beds, pumping apparatus and so on which comprise the plant. The containers are easily transportable, and may be rapidly assembled in modular fashion to produce a large capacity plant.

10 Claims, 6 Drawing Sheets

ADSORPTION APPARATUS

FIELD OF THE INVENTION

This invention relates to an apparatus for carrying out gas separation by way of Pressure Swing Adsorption (PSA) and Vacuum Swing Adsorption (VSA) processes, in particular those processes in which relatively small absolute pressure swings, at close to ambient pressures, are involved (ie Low Pressure Adsorption (LPA) processes).

BACKGROUND OF THE INVENTION

Conventional adsorption apparatus comprises at least one vessel containing one or more beds of adsorbent material. Gases to be separated are passed vertically through the adsorbent beds, each of which is no more than 1 to 2 m in height, due to the maximum permissible pressure drop as the gas flows through the bed. Multiple beds are usually arranged in series within a vessel in order to maximise adsorption. The vessels containing the adsorbent beds are usually cylindrical, with convexly dished ends, since such a configuration makes for a robust pressure vessel having reliable and easily-calcuable performance characteristics when subjected to internal or external pressure.

These cylindrical pressure vessels are designed for use in either a vertical or a horizontal position, the adsorbent beds contained therein normally being designed to operate with vertical gas flows therethrough. Generally, vertical vessels are preferred since in practice these have a constant vertical cross-section and thus give the best, most uniform gas flow distribution. However, in order to optimise adsorption performance, as mentioned above, multiple beds are used, which leads to very tall pressure vessels, which cannot be transported except in the horizontal position. This can damage or adversely affect the adsorbent beds therein unless these have been specifically designed to undergo such treatment, which leads to unnecessary design and manufacturing expense.

To address the transport limitations associated with vertical vessels, some manufacturers have used horizontal pressure vessels, which are relatively easily transported whilst containing the adsorbent beds. However, the variable cross-sectional area of the adsorbent bed or beds (in the vertical direction of gas flow) leads to a variable gas flow distribution within the bed and this gives rise to process losses.

A further problem with large gas separation plants is due to the high temperature differences which are generated within the adsorbent beds. These can be very significant, and on some PSA plants have been measured at +60° C. at the top of a 2 m high bed, and −90° C. at the bottom of the bed. Needless to say, such a wide temperature variation along the effective height of the bed gives rise to poor performance; losses of up to 60% have been noted in some instances.

A temperature gradient across the gas flow discourages uniform gas flow distribution, thus preventing the creation of "fronts" of gas as a flow passes through the bed and results in premature "break through" at the top of the bed (this phenomenon is well known and documented in the art, and therefore not described in detail here). The consequent loss of performance can also approach 60% (measured on a plant having a −90° C. cold spot at the vessel centre and a −10° temperature at the vessel wall, across the direction of gas flow).

SUMMARY OF THE INVENTION

Accordingly, apparatus for effecting adsorptive separation of at least one gaseous component comprising at least one transportable cargo container having a pair of side walls, a pair of end walls, a base and a roof, wherein the pair of side walls, the base, the roof, and at least one of the end walls define a vessel for containing at least one bed of adsorbent material, and wherein the apparatus is adapted to operate on a low pressure swing not exceeding 3 bar absolute.

Such an apparatus is not only significantly simpler and cheaper than a conventional cylindrical vessel to manufacture but is far more easily transported, given the familiarity of the haulage industry with standard, transportable ISO freight containers, which the vessel of the present invention can be made to resemble (at least outwardly). Despite the lesser structural strength of such a configuration as compared to a cylindrical vessel, a rectilinear vessel can easily be made sufficiently robust to withstand the relatively low pressure differences relative to ambient pressure which are typical in LPA processes; accordingly the vessel of the present invention is particularly suited for these processes. In practice, the functioning of the vessel of the present invention is less affected (for example, by atmospheric pressure affecting the vessel's structural integrity or allowing air ingress or gas egress) when under pressure than under vacuum, and accordingly is best suited at pressures between −1 and +2 bar gauge. A further advantage of the above-described arrangement is that the vessel can easily be adapted to contain one or more adsorbent beds spaced horizontally and configured for vertical gas flows therethrough, and the substantially vertical walls of transportable containers give a constant cross-section transverse to the direction of gas flow.

The vessel may be provided with bracing means which are mounted to, extend between and are adapted structurally to brace the side walls of the container, the bracing means being adapted thermally to conduct heat into and from localised areas within the bed which areas, in use, become cold and hot in the direction, from and toward the side walls respectively.

In this way the means providing the structural support, which is typically necessary as absolute pressure swings increase towards 2 bar, can also function as means for "smoothing out" the temperature gradients created in the adsorbent bed in use. Aluminium, brass or aluminium alloy are suitably strong and thermally-conductive materials.

The bracing means preferably comprise a plurality of plates disposed substantially parallel to the end walls, so as to permit free movement of gas in the vertical direction, and to provide thermal conduction in both the vertical and one horizontal plane. These plates may be sized relative to and disposed within the vessel so as to permit at least limited movement of gas and/or adsorbent in directions generally perpendicular to the plates. This maintains a substantially level top surface to the bed of particulate adsorbent. To assist this function, the plates may be perforated. The plates may be formed of aluminium, aluminium alloy, brass or steel.

As mentioned above, the apparatus is preferably adapted for vertical gas flows. To achieve this, the or each container may be provided with means adapted to supply and distribute the mixed gas stream into the bed of adsorbent material at the base of the container. To cope with the gas flow reversals necessary in most normal gas separation processes, the supply and distribution means may be sized and configured for the collection and withdrawal of a mixed gas stream. Additionally or alternatively the apparatus may comprise means adapted to collect and withdraw gas passing from the bed of adsorbent material, and/or means to supply and distribute purging gas into the bed of adsorbent material, located adjacent the roof of the container.

A complete LPA system may be contained within a single container, or the system may comprise a plurality of containers which can be connected in modular fashion to produce a working system.

In the former case the apparatus for separating a gaseous component from, for example, air, may comprise a single vessel sealingly partitioned into two or three sections by means of one or two partition walls substantially parallel to the end walls, the sections adjacent the end walls being of substantially equal volume and each being adjusted to contain a bed of adsorbent material.

Alternatively, the roof of the or each container, or at least a major portion thereof, may be releaseably attached. With such an arrangement pairs of containers can be connected together by means of a gas tight seal extending around the periphery of the contiguous roofs, the releasable roofs or portions thereof having been detached.

BRIEF DESCRIPTION OF THE DRAWINGS

Embodiments of the invention will now be described, by way of example and with reference to the accompanying drawings, in which.

DETAILED DESCRIPTION OF THE INVENTION

Figure 1:
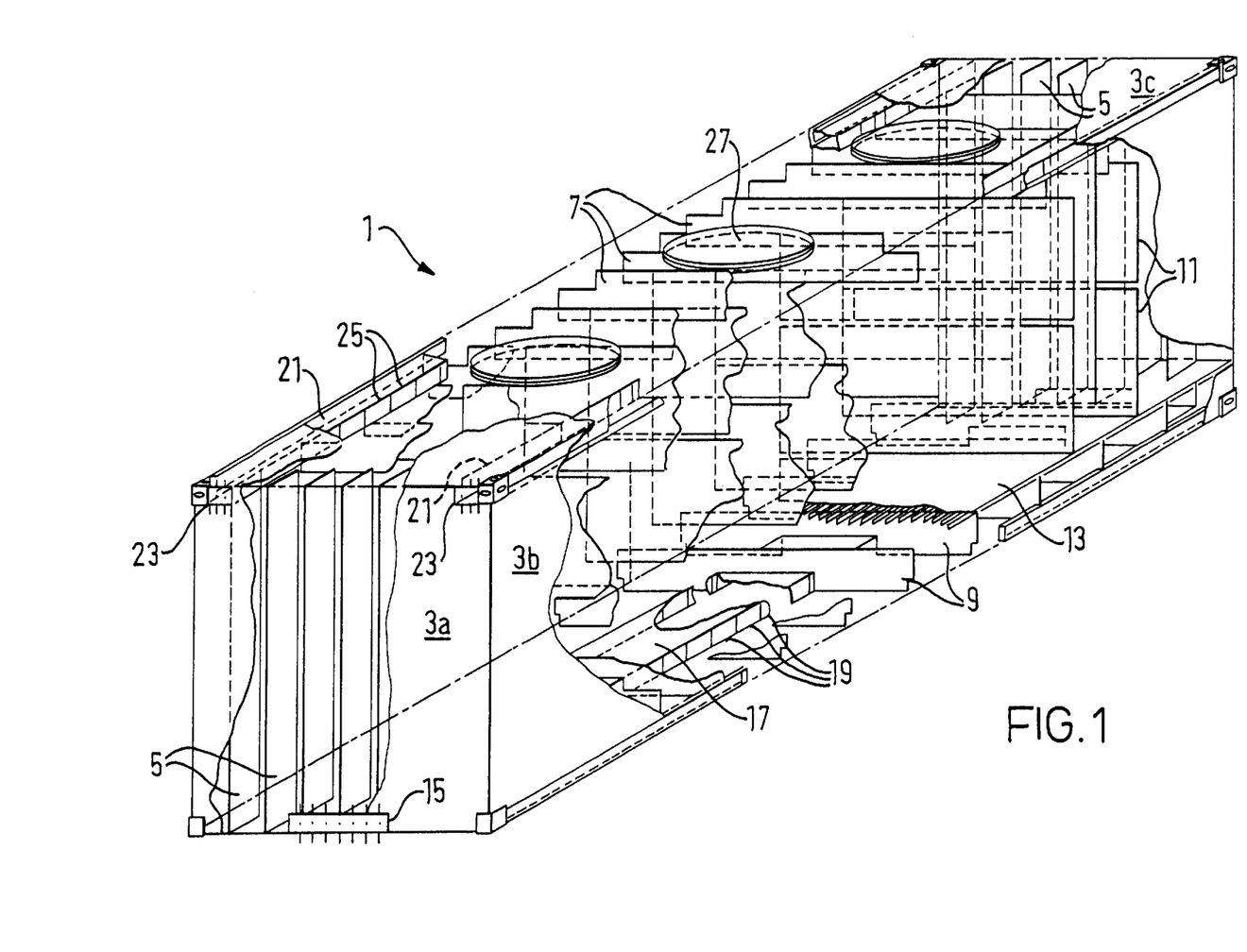
FIG. 1 is an isometric schematic view of a first embodiment of a container forming part of an apparatus in accordance with the invention.

The rectilinear container 1 for a single bed of adsorbent material illustrated in FIG. 1 is in the form of a standard 20 foot or 40 foot (6.1 m or 12.2 m) ISO freight container, having end, side and top and bottom walls 3a, 3b, 3c which can be of sheet steel or corrugated for stiffening. In all outward respects, container 1 strongly resembles a standard freight container, and has all the usual external mountings and fixtures provided for the handling and transportation of such containers. The significant difference between the container 1 and standard freight containers is that container 1 is preferably substantially, hermetically sealed against the ingress or egress of gas, with the exception of those inlets and outlets required for the operation of an adsorption process cycle.

Members 5, 7, 9 are welded to the respective walls 3a, 3b and 3c of the container to stiffen these to allow the flat sided container 1 to accept without deformation the pressure swings undergone during an adsorption process. These stiffeners would preferably be on all six sides for a VSA vacuum vessel but only need to be on four sides for a PSA pressurised container, for in the case of a pressurised vessel complementary sheets of metal 11 extend from one side 3b of the container to the other to hold these together. Plates 11 also act as heat distribution plates for thermal dissipation across the vessel and throughout the bed of adsorbent material. Plates 11 do not form a complete barrier to gas or adsorbent material movement in a direction perpendicular to end wall 3a, and they may be provided with perforations or holes (not shown) so as to encourage such movement but without adversely affecting the plates' structural and/or thermal conduction function.

Adsorbent material within the container 1 is supported upon a sieve support screen 13, which can be made of wedge wire or grating with perforated plates and wire mesh, and is supported upon the floor stiffening members 9.

An inlet 15 for feed gas is provided at the base of the end wall 3a, and leads to ducting 17 which extends along the length of the container 1. Conventional feed gas connections (not shown) are provided at the inlet 15 at either end of the container 1, although in practice only one inlet 15 would normally be used, with the other inlet 15 being closed off. Feed gas entering the ducting 17 via inlet 15 would be distributed into the spaces between the stiffening members 9 at the base of the container 1 through the nozzles 19.

Feed gas introduced into the container 1 via ducting 17 passes upwardly through the sieve support screen 13 and through the adsorbent material held within the container, a component of the feed gas being adsorbed by the adsorbent and a product gas is collected in outlet ducting 21 and leaves the container via outlet 23.

As is well known to those who are skilled in the art, cyclical adsorption process necessitate the reversal of gas flows, and this is effected in the container 1 illustrated by reversing the functions of the ducting 17, 21, so that purge/equalisation/backflow gas is introduced via ducting 21 and nozzles 25, to pass downwardly through the adsorbent material within the container 1 and the sieve and support screen 13 and out of the container via ducting 17.

The container 1 is designed such that each side 3a, 3b and 3c may be manufactured separately as flat elements which can be assembled easily. Access ports 27 are provided in the roof panel 3c to permit access to the interior of the container 1 for inspection and maintenance purposes and also for loading the container with adsorbent material (in operation access ports 27 are, of course, sealed). Fully loaded with adsorbent material, container 1 would exceed transport restrictions on standard container loading, however container 1 would remain more easily transported than a conventional cylindrical vessel. Alternatively, the adsorbent material could be transported separately, to be added in situ.

The above-described embodiment is suitable for the construction of an adsorption plant comprising two or more such containers 1; in a typical plant, two containers 1 would be provided, with a third which would hold all the other components (i.e buffer vessels, pumps, connectors etc) necessary for a complete gas separation plant. In this way, a complete LPA plant of substantially any capacity can be assembled quite easily in modular fashion, as is described below in connection with FIGS. 3a and 3b.

Figure 2:
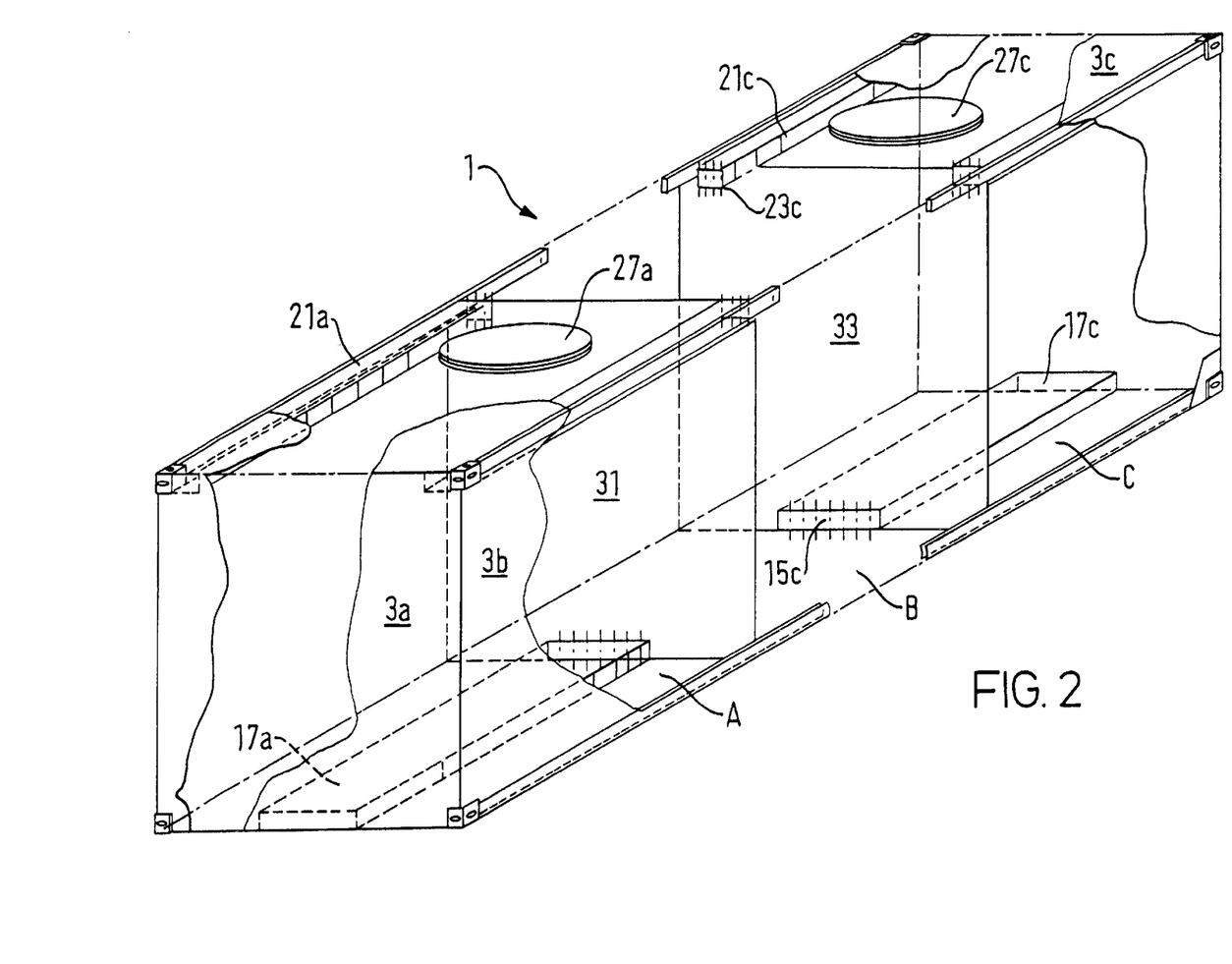
FIG. 2 is an isometric schematic view of a second embodiment of a container forming part of an apparatus in accordance with the invention.

The container 1' illustrated in FIG. 2 is suitable for smaller adsorption plant output. Externally, container 1' is very similar to container 1 shown in FIG. 1. Internally, partition walls 31, 33 sealingly divide the container 1' into three separate compartments A, B, C. End compartments A, C each comprise a single bed of adsorbent material (not shown) and are largely configured in similar fashion to the embodiment of FIG. 1, as is illustrated by the use of the suffix A or C as appropriate. For clarity the various stiffening elements and heat distribution elements are not shown in FIG. 2.

The central compartment B of container 1' houses the necessary buffer vessels, distribution machinery, valves and ancillaries necessary for the operation of an adsorption process. A significant difference between the embodiment of FIG. 2 and that of FIG. 1 is that in FIG. 2 the ductwork outlet and inlet 15c, 23c are disposed on the internal partition walls, 31, 33 rather than on the container 1' end walls 3a. Means (not shown) are provided for operator access to compartment B, for maintenance and operation purposes.

The container configurations described in FIGS. 1 and 2 would be suitable for high performance oxygen sieves, for air separation plants, where gas flows/pressure drops restrict adsorbent bed heights to around 5 to 6 feet (1.5 to 1.8 m). Where lower performance adsorbents are used, an increased bed height is required, especially on PSA Air Separation plants where heights of up to 10 feet (3 m) are commonly used. For such configurations, the containers can be stacked so that the upper container is either upright or inverted, and sealed around their contiguous edges. With such an arrangement, at least a part of the roof of the lowermost container, and at least a portion of either the base or the roof of the uppermost container (according to whether the uppermost container is upright or inverted, respectively), must be detached before the two containers are joined together in order to permit gas flows through the two standard containers. It will be apparent to those skilled in the art that, depending upon configuration and orientation, elements of the container 1 shown in FIG. 1 may be modified and/or omitted in order to facilitate the stacking of the containers so as to produce a modular, high output LPA plant.

Figure 3A:
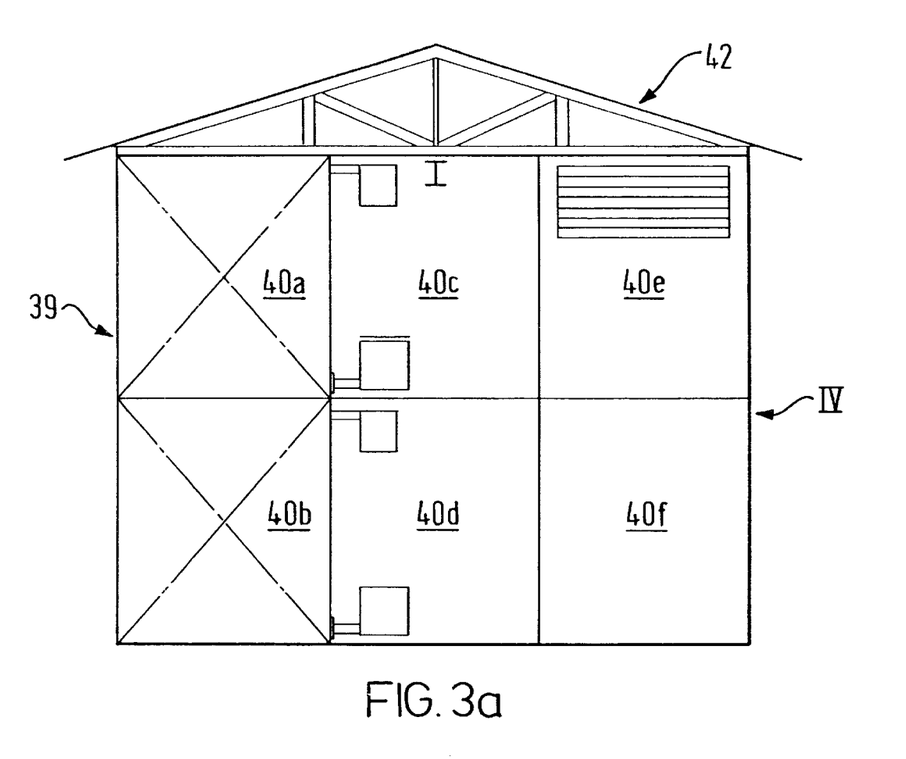
FIGS. 3a and 3b are schematic end and side views, respectively, of an apparatus in accordance with the invention comprising a number of containers assembled in modular fashion.
Figure 3B:
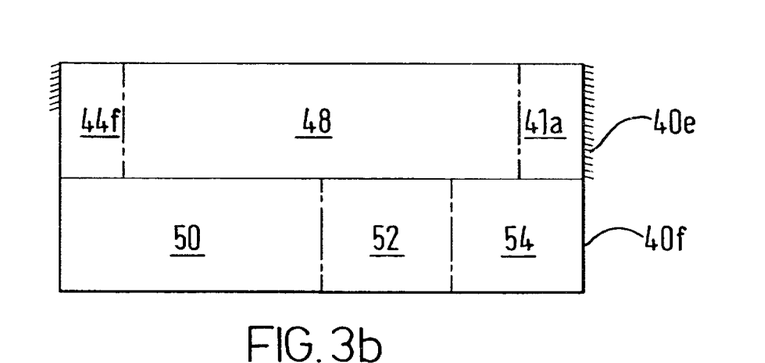

FIGS. 3a and 3b are, respectively, end and side views (FIG. 3b being a view along arrow IV of FIG. 3a) of an assembled modular PSA (ie high output LPA) apparatus 39 comprising 6 ISO containers 40a–f. Containers 40a and 40b comprise adsorbent containers such as that in FIG. 1, one atop the other, whilst containers 40c–f comprise, respectively, a piping skid, a second piping skid, a buffer and a machine skid (the function of these devices is well-known to those skilled in the art and therefore only a few particular features of these are described here); the whole apparatus is provided with a roof structure 42.

Turning to FIG. 3b, buffer container 40e comprises a silencer compartment 44 and an air inlet filter compartment 46 as well as a buffer compartment 48, and machine skid 40f comprises an airblower 50, an instrument air room 52 and a control room 54.

FIGS. 4a to d illustrate a further embodiment of a container 60 forming part of an apparatus in accordance with the invention in which the gas ductwork (not shown) is mounted externally of the container dimensions. This enables the overall length of the container to be reduced for a given plant design throughput, enabling the apparatus to be transported more easily. By comparison with the container in FIG. 2, for example, the central Section B is not present and the contents thereof, in the FIG. 4 embodiment, would be transported separately and mounted to the container 60 when the plant is assembled on site.

Container 60 also has a different internal gas flow arrangement to that of containers 1 and 1', which is designed to minimise the presence of voids in the adsorbent_material, which voids otherwise would adversely affect adsorption/desorption and thus the plant performance.

Container 60 is divided into two sections D, E of substantially equal volume by a central plate 62. As in the embodiments of FIGS. 1 and 2, each section D, E contains stiffening members 64, 66 attached to the side and top and bottom walls of the container (for clarity; stiffening members 66 are only shown attached to the top of the container in FIG. 4b), and plates 68 extend between the side members 64 in exactly the same manner, and with the same functions, as described above in connection with FIGS. 1 and 2. The stiffening members on the base of the container are, however formed so as to provide channels 66' for the passage of gas across the base of the container 60 (rather than along the long axis of the container as in FIGS. 1 and 2). The upper surfaces of these stiffening members are provided with perforations for the passage of gas into the adsorbent contained in the sections thereabove. The transverse gas flow channels 66' are most clearly shown in the broken away detail side elevation view of FIG. 4c.

Figure 4A:
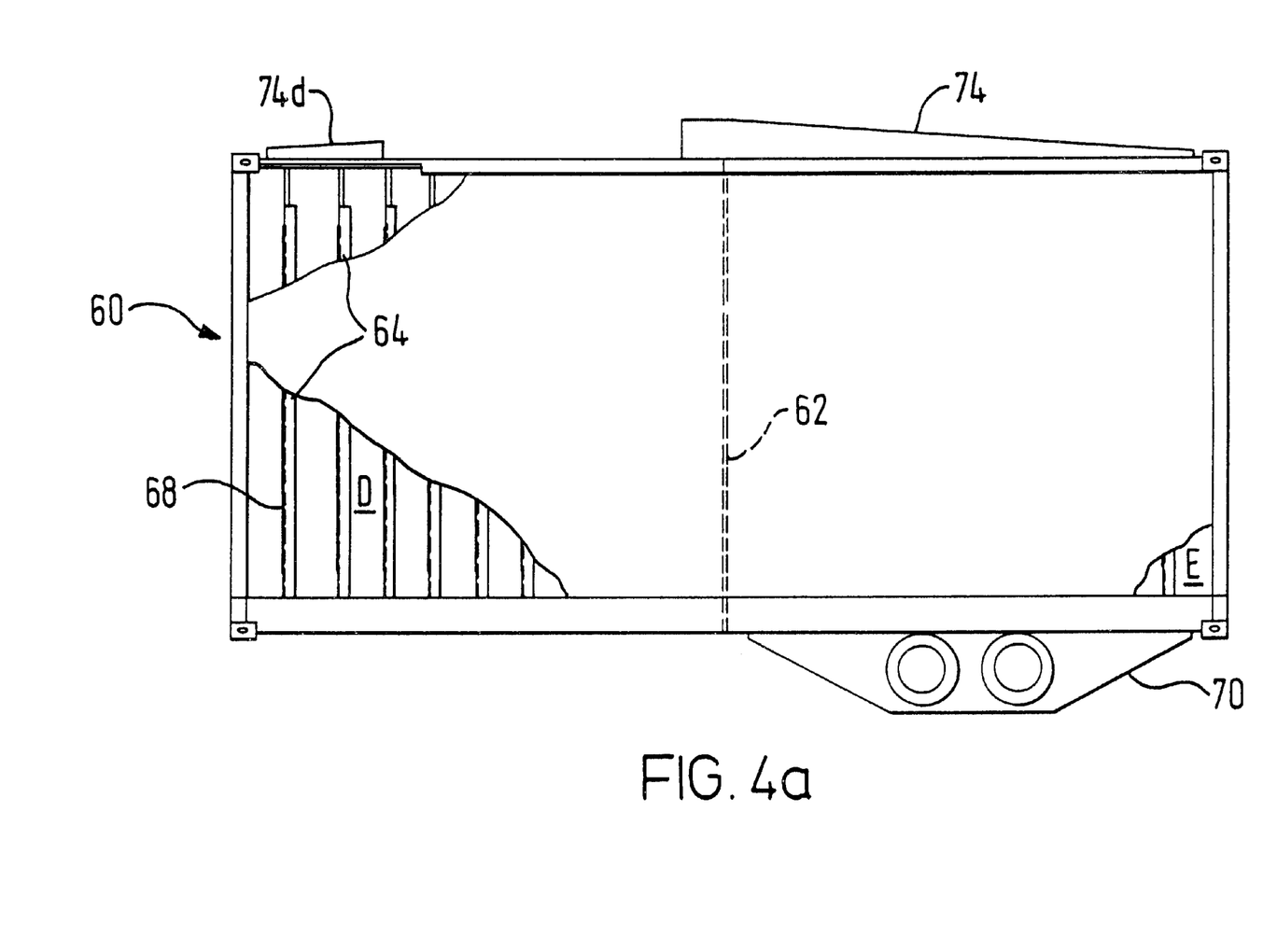
FIGS. 4a and 4b are side elevation and plan views, respectively, partially broken away, of a further embodiment of a container forming part of an apparatus in accordance with the invention.
Figure 4B:
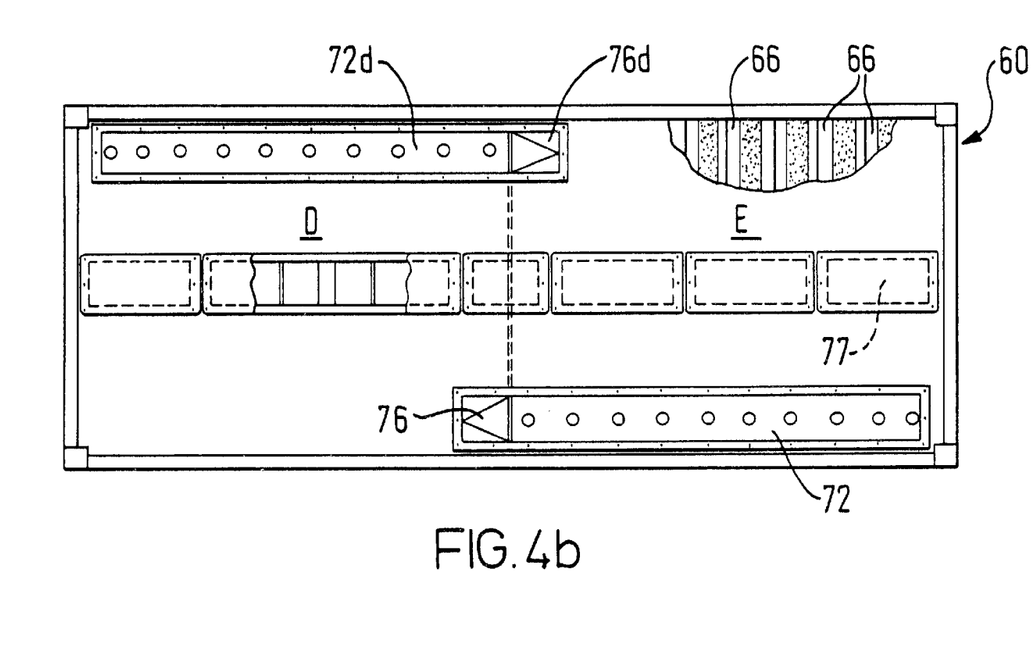
Figure 4C:
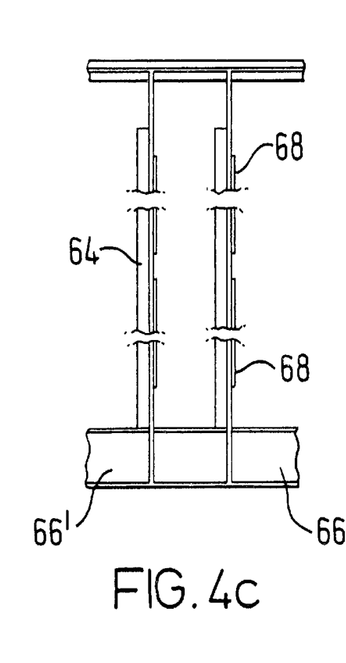
FIG. 4c is a detailed, sectional side elevation view of the container of FIGS. 4a and 4b.
Figure 4D:
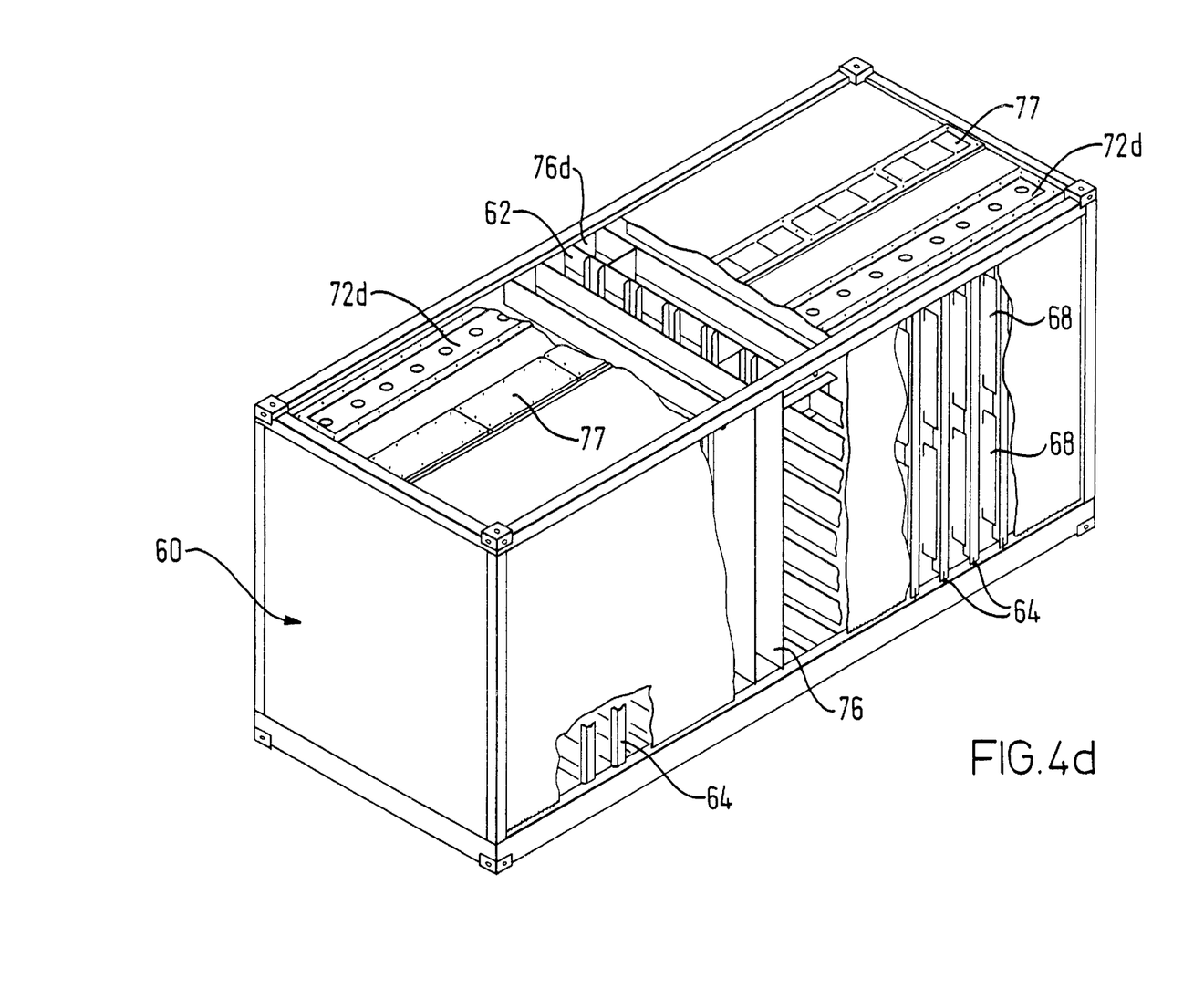
FIG. 4d is an isometric, partially broken away view of the container of FIGS. 4a and 4b.

Referring now to FIG. 4a, a hood 70, preferably detachable, is provided for the air inlet ductwork (not shown) to be mounted to the base of the container 60, and a longitudinal manifold (not shown) inside the container distributes air between the tranverse channels 66'. This air then flows upwards through the adsorbent in section E, and the gas flow following adsorption emerges from manifold 72, is collected in demountable hood 74 and channelled into duct 76. Duct 76 takes the gas flow down towards the base of container 60 for collection by the external ductwork. A similar arrangement is provided for Section D (illustrated with the addition of "d" to the reference numerals), though for clarity not all elements are shown.

As with the other embodiments, access ports 77 are provided on the top of the container, these being sealed when the plant is assembled for use.

It will be appreciated that the arrangement illustrated in FIGS. 4a to d is considerably more compact than that of FIG. 2. Also, the gas flow arrangements are such that gas is introduced over the whole base area of each section, so as to flow vertically through the complete cross-sectional area of the adsorbent, which is highly efficient. The vertically upward flow of gas through all of the adsorbent also acts advantageously to agitate the adsorbent and thereby minimise undesirable voids in the material.

We claim:

1. Apparatus for effecting adsorptive separation of at least one gaseous component
   from air comprising at least one transportable cargo container having a pair of side walls,
   a pair of end walls, a base and a roof, wherein the pair of side walls, the base, the roof, and at least one of the end walls define a vessel sealingly partitioned into three sections by means of the two portion walls substantially parallel to the end walls, the sections adjacent the end walls being of substantially equal volume and each being adapted to contain a bed of adsorbent material, and wherein the apparatus is adapted to operate on a low pressure swing not exceeding 3 bar absolute.

2. The apparatus as claimed in claim 1, wherein said vessel is provided with bracing means which are mounted to, extend between and are adapted structurally to brace the side walls of the container, the bracing means being adapted thermally to conduct heat into and from localised areas within the bed, which areas, in use, become cold and hot in a direction from and toward the side walls respectively.

3. The apparatus as claimed in claim 1, wherein said vessel is provided with bracing means which are mounted to, extend between and are adapted structurally to brace the side walls of the container, the bracing means being adapted thermally to conduct heat into and from localised areas within the bed, which areas, in use, become cold and hot in the direction from and toward the side walls respectively, and the bracing means comprises a plurality of plates disposed substantially parallel to the end walls.

4. The apparatus as claimed in claim 3, wherein the plates are sized relative to and disposed within the vessel so as to permit at least limited movement of gas and/or adsorbent in directions generally perpendicular to the plates.

5. The apparatus as claimed in claim 3, wherein said plates are perforated.

6. The apparatus as claimed in claim 3, wherein said plates are formed of aluminium or an alloy thereof.

7. The apparatus as claimed in claim 1, wherein said container is provided with means adapted to supply and distribute the mixed gas stream into the bed of adsorbent material at the base of the container.

8. The apparatus as claimed in claim 7, wherein the supply and distribution means is sized and configured for the collection and withdrawal of said mixed gas stream.

9. The apparatus as claimed in claim 7, comprising means located adjacent the roof of the container and adapted to collect and withdraw gas passing from the bed of adsorbent material, and means to supply and distribute purging gas into the bed of adsorbent material.

10. The apparatus as claimed in claim 1, wherein the roof of the said container, or at least a major portion thereof, is releasably attached.

* * * * *